Patented Oct. 24, 1944

2,361,277

UNITED STATES PATENT OFFICE 2,361,277

EMULSIONS IN PASTE FORM AND TEXTILES PRINTED WITH THE SAME

Florian Enderlin and Luzius Schibler, Basel, Switzerland, assignors to Society of Chemical Industry in Basle, Basel, Switzerland No Drawing. Application May 25, 1940, Serial No. 337,322. In Switzerland June 12, 1939

10 Claims. (Cl. 260—6)

This invention is concerned with stable emulsions in paste form, having a basis of casein formaldehyde compounds suitable for the improvement of fibrous materials, particularly textiles, and it comprises the emulsions themselves and the process of their manufacture as well as their uses, particularly for improving fibrous materials, particularly textiles and in the first line as binding agents for pigments particularly for use as printing pastes.

It is known that colorless and colored pigments and other substances suitable for use in the improvement of fibrous materials such as textiles etc. may be fixed on woven fabrics, paper, leather and the like in a form fast to water and washing by means of artificial resins capable of being hardened, particularly, also, by means of compounds of urea and formaldehyde. These preparations are applied to the material by printing, spraying or by other suitable means. The resulting products are either allowed to dry in the air or are subjected to a process of fixation at a raised temperature. In addition to urea and formaldehyde, or initial condensation products of these substances such as dimethylol urea, etc., these pastes contain large quantities of thickening agents, such as gum arabic, gum tragacanth, British gum, casein, albumen, and other high molecular, strongly thickening substances which yield colloidal solutions. When the pastes are dried, these thickening agents leave large residues of dry substance which, for the most part, cause dulling of the dyeing and stiffening of the fabric, and which must be removed in a subsequent washing process, an operation which one tries to avoid as far as possible in modern pigment printing processes. Effects are obtained which are more or less fast to washing according to the quantities of binding agent or pigment used and the conditions under which fixation takes place.

It is also known that products containing binding agents, for example paints or water colors for intaglio printing, can be thickened—that is, brought into a condition suitable for use—by the inter-emulsification of aqueous or oily liquids, by which means the presence of a high content of binding agent is simulated on account of the thickening which takes place.

It has now been shown that these thickenings, obtained by the emulsification of two solvents or solutions which are immiscible with one another, are particularly suited for use as textile finishing agents in paste form, as in this case the thickening agent does not remain behind after drying to cause stiffening of the fibrous material, as was the case in regard to the preparations mentioned above. Rather do the emulsified solvents volatilize completely, and only the suspended or dissolved solid or difficultly volatile liquid substances, the quantities of which are maintained as small as possible, remain. After the drying or fixation of the finished textile materials, products of brilliant, un-dulled color are thus obtained which are directly ready for sale without further treatment.

In order to manufacture smooth and stable pastes by means of emulsion thickenings, it is necessary to use an emulsifier which makes possible the fine dispersion of the disperse phase in the dispersing agent. It has been found that the formaldehyde compounds of alkali metal caseinates are particularly suitable for this purpose. It is known that binding agents in emulsion form may be built up on a basis of casein glues. It is also known that casein glues tolerate the addition of formaldehyde in certain quantities under certain conditions and that they can remain usable for a short time. But generally, casein binding agents which contain formaldehyde are considered as being unstable, that is to say, they separate out in flakes, or they gel after some time, after which it is impossible to bring them into solution again. This is also true of those systems which contain formaldehyde in a combined state—for example in the form of hexamethylenetetramine which, in time, reacts on casein glues in a similar hardening manner.

It has now been shown that solutions containing alkali metal caseinate and formaldehyde neither separate nor gel—even after standing for a year—provided their casein content amounts to less than 12 per cent, preferably less than 10 per cent. Such systems, moreover, can show a plainly acid reaction and can contain a far greater quantity of formaldehyde than is necessary for the hardening of the casein. An alkali metal caseinate-formaldehyde solution of this type has the property—very important for the present object—of gelling to an irresversible gel on drying and leaving behind a film which is waterproof. The emulsifying properties are also completely lost on evaporation of the water, and the fastness to water of the residual film of binding agent is in no way influenced thereby, as is the case when emulsifiers are used which remain behind in a soluble state, such as soap, sulforicinoleates, gum arabic, plant glues, dextrines, etc.

As a rule, it is impossible to emulsify large quantities of liquids which are immiscible with water in a solution containing less than 12 per cent of alkali caseinate—or, at best, the emulsion formed is unsatisfactory—as the viscosity of a so dilute solution of casein glue is too low. On the other hand, a concentrated pure alkali metal caseinate solution will not tolerate the formaldehyde addition without being liable to separation or gelling within a short period of time. However, these difficulties may be overcome by carrying out the emulsification in a concentrated solution containing more than 12 per cent. of casein and then only diluting with water to such an extent that, after the formaldehyde addition has been carefully made with stirring, the concentration of casein in the aqueous phase will not overstep the prescribed limit which is preferably set at 9–10 per cent. By the use of larger or smaller quantities of the organic liquid in making the emulsion, the preparations may be prepared in any desired consistency and—which was not to be foreseen—are very stable and capable of being stored.

The properties which may be attained with these printing colors or finishing agents, in particular the property of fastness to washing of the effects, may be appreciably improved by incorporating in the pastes a further binding agent which is capable of forming a waterproof film.

For this purpose, those substances have proved very suitable indeed, in combination with the alkali metal caseinate formaldehyde solution, which are able to form with formaldehyde condensation products capable of being hardened as, for example, urea, thiourea, guanidine, dicyandiamide, melamine and the like, or mixtures of these compounds.

If the condensation of these substances with formaldehyde takes place in the presence of the alkali metal caseinate, products are obtained which are particularly stable and which have an especially colloidal or finely dispersed character. This is of great importance to their use in printing, as the binding agent units with the textile material being treated proportionately better as its structure becomes finer and more homogeneous. The presence of large particles should also be avoided as far as possible, as these do not penetrate sufficiently into the material and thus cause the finished production to have a poor fastness to rubbing. In the preparation of the primary condensate, that is, of the binding agent which is capable of being hardened and which forms the basis of the emulsion, the casein concentration may certainly temporarily surpass 12 per cent, but such systems will always give rise to the irreversible gelation on being allowed to stand for any considerable time and, therefore, in order to get stable preparations, dilution to a casein content of less than 12 per cent. must take place within a certain time. The acid binding agent is preferably neutralized with borax or the like.

In the viscous solution obtained, the organic liquid necessary for further thickening is now emulsified. This liquid serves merely to raise the viscosity and to lower the dry content of the paste. It does not wet the material and it volatilizes completely after printing is complete, whilst the binding materials and other non-volatile constituents which remain on the fabric are fixed by a short heat treatment in a state which is fast to washing and rubbing.

The printing pastes may contain, both in the aqueous and in the oleaginous phase, constituents which are suitable for the impregnation and finishing of the fibrous materials and fabrics, such as, for example, colored and colorless pigments, filling agents, softeners, etc., which are fixed by means of the binding substance.

These additions may be made either to one of the two phases before emulsification or to the printing emulsions immediately before use, if desired in the form of well-ground pastes of a more or less liquid consistency or in the form of easily dispersible powders.

Naturally, still other binding agents which are soluble in water or in oil may be added to the pastes, for instance, such substances as rubber and its derivatives, drying oils and lacquers and all types of artificial resins which are capable of being hardened.

The preparations may be mixed among themselves as desired and may be diluted with water, if necessary, to the desired consistency. Material which has been printed or impregnated with such pastes and then dried in the air already withstands a gentle wash in soap solution. By fixation at higher temperatures, for example, by heating for 5–60 seconds at 150° C., or by longer heating at 100–110° C., the binding agents are made insoluble, that is, they are hardened so that the prints obtained may then be soaped at the boil without experiencing much fading. The hardening time of the resinous binding agent is dependent firstly on the degree of pre-condensation and secondly on the pH-value of the paste. Acid pastes harden the fastest. If desired, substances which accelerate hardening may be added to the pastes.

Organic liquids which are immiscible with water and which come into consideration for the present process are those which have a boiling point lying not apprecibaly below 100° C. nor appreciably above 250° C. Such organic liquids are, for example, white spirit, xylene, chlorobenzene, tetralin and the like.

Textile materials constitute the primary subjects for the present finishing, or improving, process, but other fibrous materials, such as paper, leather, wood, etc., may also be improved in quality by this process.

*Example 1*

3 parts of titanium dioxide are finely dispersed in a mixture of 20 parts of casein-borax solution of 20 per cent strength, containing 1 part of borax to every 9 parts of casein, and 4 parts of urea. 45 parts of xylol are added in small portions to the paste obtained, the xylol being readily emulsified by stirring. The emulsion is now diluted by addition of 14 parts of water, and 14 parts of formaldehyde of 36 per cent. strength are allowed to run into it slowly whilst stirring well. A paste is obtained which, at first thin, becomes more viscous after standing for some days, and which is then suitable for use in the printing machine. Material printed with this paste is dried for 3 minutes at 60° C. and is then heated for a further five seconds at a temperature of 150° C. In this way, damask effects are obtained on cotton or on rayon which do not cause appreciable stiffening of the fabric and which are scarcely affected by washing in soap solution at 90° C.

*Example 2*

15.3 parts of urea and 2.7 parts of thiourea are dissolved in 90 parts of a casein-borax solution of 20 per cent. strength as described in Example 1. Into this solution are then ground 8 parts of lamp-black. 170 parts of a solution of crude rubber in chlorobenzene of 2 per cent. strength are emulsified in the resulting pigment paste by allowing the rubber solution to flow slowly into the paste whilst stirring continuously. The mixture is then diluted with 54 parts of water, 60 parts of formaldehyde of 36 per cent. strength are then added slowly, and the resulting mixture is run through a fine sieve into a container which is well closed. When printed onto textile materials, the preparation gives a black colored effect which, after drying for 24 hours in the air, withstands a soap wash at 60° C. very well. If the print be fixed for 5 seconds at 150° C., it may be soaped at 90° C. without showing any degradation.

*Example 3*

2 parts of Permanent Red (Color Index, page 362) are finely ground into a mixture of 30 parts of casein-borax glue of 20 per cent. strength, obtained as described in Example 1, to which have been added 5 parts of urea. 25 parts of white spirit containing 10 per cent. of boiled linseed oil are emulsified in the pigment paste. The emulsion is diluted with 20 parts of water and 18 parts of formaldehyde of 36 per cent. strength are then added with stirring. The paste which is at first thin but which later thickens, stiffens the printed material rather more, on account of the increased content of dry matter. After fixing for 5 seconds at 150° C. and hanging for 24 hours, a moderate to good fastness to washing is obtained.

*Example 4*

3 parts of Indanthrene Brilliant Green B (Color Index Supplement, page 43) are suspended in a mixture of 45 parts of casein-borax solution of 20 per cent. strength (obtained according to the method given in Example 1) with 7 parts of urea and 2 parts of thiourea. In this pigment suspension, 90 parts of a mixture of 90 per cent. chlorobenzene and 10 per cent. tetralin are emulsified, and the mixture is then diluted with 28 parts of water and 25 parts of formaldehyde of 36 per cent. strength are dropped in. After standing for some days, a paste is obtained which is suitable for printing and which possesses good keeping properties. When printed on fabrics and steamed for 5 minutes, or heated for 5 seconds to 150° C., it yields color effects which are fast to washing which do not stiffen the material to any marked extent. The shade obtained is clear and vivid and corresponds accurately with the natural shade of the dyestuff used.

*Example 5*

4 parts of the complex copper compound of phthalo-cyanine are finely ground into a solution consisting of 9 parts of casein, 1 part of borax, 8 parts of urea, and 1 part of guanidine dissolved in 35 parts of water. 80 parts of a solution of 2 per cent. strength of chlorinated rubber in white spirit are emulsified in the above solution, a small quantity at a time. The emulsion is diluted with 27 parts of water and then 35 parts of formaldehyde of 36 per cent. strength are added with care. Printed material, after being subjected to a temperature of 160° C. for a few seconds, shows good fixation of the printing paste and successfully resists washing in a boiling soap bath.

*Example 6*

8.5 parts of urea and 1.5 parts of thiourea are added to a solution of 9 parts of casein and 1 part of borax in 40 parts of water. After they have dissolved, 30 parts of formaldehyde of 36 per cent. strength are added in drops, and the mixture is allowed to stand until a gel has formed which, although tough, is still easily dispersible in water; at normal temperature this usually takes some days. The gel is now swollen with 25 parts of water and is stirred to a viscous solution in which 5 parts of Hansa Yellow G (Color Index Supplement, page 42) are now suspended. 80 parts of pure chlorobenzene are now added gradually to this pigment paste, and the whole is homogenized to form a viscous, stable emulsion which may be used for screen or roller printing purposes. After printing, the cloth is dried and then heated to 150° C. for 30 seconds. Prints of pure yellow shade are obtained which do not cause stiffening of the fabric and which are fast to washing and rubbing.

*Example 7*

A solution containing 20 parts of casein, 2 parts of borax and 16 parts of urea in 78 parts of water and another solution containing 4 parts of melamine in 60 parts of formaldehyde of 36 per cent strength are prepared, and the melamine-formaldehyde solution is allowed to drop into the casein-urea solution, during which the latter is well stirred. After standing for about 24 hours, the mixture has thickened to a tough gel which is now stirred with 79 parts of water until it forms a viscous solution of resin. This solution which usually contains a small proportion of highly condensed resin in fine dispersion, is then neutralized with 1 part of borax. 140 parts of a 2 per cent. solution of crude rubber in chlorobenzene are now allowed to run in, and the resulting paste is homogenized by means of an ointment mill or a kneading machine. The emulsion dries to form a completely colorless and transparent film and is completely stable. It may be used, for example, in the following manner:

95 parts of the above binding agent are mixed with 5 parts of a finely ground paste of Cibanone Blue RS (Color Index No. 1106). The Cibanone Blue RS paste is obtained by grinding 1 part of dyestuff in 3.5 parts of casein solution of 10 per cent strength and subsequent addition of 0.5 part of urea. By this means, the casein is prevented from separating out when mixed with the binding agent which contains formaldehyde. The printing color obtained is used as is described in the previous example. The printed or impregnated goods are heated for 40 seconds to 155° C. and effects are obtained which are fast to washing, rubbing, and chlorine, and which are also completely stable towards dilute alkalis and acids as well as towards organic solvents, such as petroleum ether, acetone, trichlorethylene, ethylenechlorhydrin, etc. The prints obtained after hardening are particularly remarkable also for their complete freedom from odor.

What we claim is:

1. A process for the manufacture of emulsions in paste form, stable over a considerable period of time and suitable for the improvement of fibrous materials, which comprises emulsifying, as oil phase, an organic liquid which is immiscible with water and which has a boiling point lying not appreciably below 100° C. and not appreciably above 250° C., in an aqueous alkali metal caseinate formaldehyde solution containing at least one other substance capable of forming with formaldehyde an aminoplast condensation product which is hardenable, said other substance being selected from the group consisting of urea, thiourea, guanidine, dicyandiamide and melamine, as aqueous phase, the aqueous phase of the completed emulsion containing not more than 12% of casein, said water-immiscible liquid being non-reactive with the aqueous phase and the constituents thereof.

2. A process for the manufacture of emulsions in paste form, stable over a considerable period of time and suitable for the improvement of fibrous materials, which comprises emulsifying, as oil phase, an organic liquid which is immiscible with water and which has a boiling point lying not appreciably below 100° C. and not appreciably above 250° C., in an aqueous solution of alkali metal caseinate which contains formaldehyde and urea, as aqueous phase, the aqueous phase of the completed emulsion containing not more than 12% of casein, said water-immiscible liquid being non-reactive with the aqueous phase and the constituents thereof.

3. A process for the manufacture of emulsions in paste form, stable over a considerable period of time and suitable for the improvement of fibrous materials, which comprises emulsifying, as oil phase, an organic liquid which is immiscible with water and which has a boiling point lying not appreciably below 100° C. and not appreciably above 250° C., in an aqueous solution of alkali metal caseinate which contains formaldehyde and thiourea, as aqueous phase, the aqueous phase of the completed emulsion containing not more than 12% of casein, said water-immiscible liquid being non-reactive with the aqueous phase and the constituents thereof.

4. A process for the manufacture of emulsions in paste form, stable over a considerable period of time and suitable for the improvement of fibrous materials, which comprises emulsifying, as oil phase, an organic liquid which is immiscible with water and which has a boiling point lying not appreciably below 100° C. and not appreciably above 250° C., in an aqueous solution of alkali metal caseinate which contains formaldehyde and melamine, as aqueous phase, the aqueous phase of the completed emulsion containing not more than 12% of casein, said water-immiscible liquid being non-reactive with the aqueous phase and the constituents thereof.

5. A stable emulsion in paste form, retaining its stability over a considerable period of time and suitable for improving fibrous materials, comprising as an aqueous phase an alkali metal caseinate formaldehyde solution containing not more than 12% of casein and containing at least one further substance capable of forming with formaldehyde an aminoplast condensation product which is hardenable, said other substance being selected from the group consisting of urea, thiourea, guanidine, dicyandiamide and melamine, and as an oil phase an organic liquid which is immiscible with water, which has a boiling point lying not appreciably below 100° C. and not appreciably above 250° C., and which is non-reactive with the aqueous phase and the constituents thereof.

6. A stable emulsion in paste form, retaining its stability over a considerable period of time and suitable for improving fibrous materials, comprising as an aqueous phase an alkali metal caseinate formaldehyde solution which contains not more than 12% of casein and which also contains urea, and as an oil phase an organic liquid which is immiscible with water, which has a boiling point lying not appreciably below 100° C. and not appreciably above 250° C., and which is non-reactive with the aqueous phase and the constituents thereof.

7. A stable emulsion in paste form, retaining its stability over a considerable period of time and suitable for improving fibrous materials, comprising as an aqueous phase an alkali metal caseinate formaldehyde solution which contains not more than 12% of casein and which also contains thiourea, and as an oil phase an organic liquid which is immiscible with water, which has a boiling point lying not appreciably below 100° C. and not appreciably above 250° C., and which is non-reactive with the aqueous phase and the constituents thereof.

8. A stable emulsion in paste form, retaining its stability over a considerable period of time and suitable for improving fibrous materials, comprising as an aqueous phase an alkali metal caseinate formaldehyde solution which contains not more than 12% of casein and which also contains melamine, and as an oil phase an organic liquid which is immiscible with water, which has a boiling point lying not appreciably below 100° C. and not appreciably above 250° C., and which is non-reactive with the aqueous phase and the constituents thereof.

9. The process of printing fibrous materials which comprises applying to the latter as a printing agent an emulsion which comprises, as aqueous phase, an alkali metal caseinate formaldehyde solution containing not more than 12% of casein and also containing at least one other substance capable of forming with formaldehyde a hardenable aminoplast condensation product said other substance being selected from the group consisting of urea, thiourea, guanidine, dicyandiamide and melamine, and, as oil phase, an organic liquid which is immiscible with water, which has a boiling point lying not appreciably below 100° C. and not appreciably above 250° C., and which is non-reactive with the aqueous phase and the constituents thereof.

10. Textiles printed with an emulsion which comprises, as aqueous phase, an alkali metal caseinate formaldehyde solution containing not more than 12% of casein and also containing at least one other substance capable of forming with formaldehyde a hardenable aminoplast condensation product said other substance being selected from the group consisting of urea, thiourea, guanidine, dicyandiamide and melamine, and, as oil phase, an organic liquid which is immiscible with water, which has a boiling point lying not appreciably below 100° C. and not appreciably above 250° C., and which is non-reactive with the aqueous phase and the constituents thereof.

FLORIAN ENDERLIN.
LUZIUS SCHIBLER.